(12) United States Patent
Ando

(10) Patent No.: US 6,557,943 B2
(45) Date of Patent: May 6, 2003

(54) CABLE GUIDE STRUCTURE

(75) Inventor: Masahiro Ando, Buffalo Grove, IL (US)

(73) Assignee: Omron Corp., Kyoto (JP)

( * ) Notice: Subject to any disclaimer, the term of this patent is extended or adjusted under 35 U.S.C. 154(b) by 0 days.

(21) Appl. No.: 09/650,082

(22) Filed: Aug. 29, 2000

(65) Prior Publication Data

US 2001/0017480 A1 Aug. 30, 2001

(51) Int. Cl.⁷ .............................................. A47B 97/00
(52) U.S. Cl. ................ 297/463.1; 297/463.2; 297/217.1; 248/51; 248/424
(58) Field of Search .................. 297/424, 463.1, 297/463.2, 217.1, 217.3; 248/424, 429, 51, 118.1, 346.01

(56) References Cited

U.S. PATENT DOCUMENTS

| | | | | |
|---|---|---|---|---|
| 3,082,983 A | * | 3/1963 | Kaller | 248/51 |
| 3,312,434 A | * | 4/1967 | Simon | 248/62 |
| 4,025,099 A | | 5/1977 | Virden | |
| 5,247,925 A | | 9/1993 | Yamasaki et al. | |
| 5,371,920 A | | 12/1994 | Rainville | |
| 5,826,842 A | * | 10/1998 | Paulse et al. | 248/118.1 |
| 6,257,609 B1 | * | 7/2001 | O'Neill, Sr. | 280/304.1 |

* cited by examiner

*Primary Examiner*—Peter M. Cuomo
*Assistant Examiner*—Stephanie Harris
(74) *Attorney, Agent, or Firm*—Dickstein Shapiro Morin & Oshinsky, LLP

(57) ABSTRACT

A cable guide is provided for a movable body such as a chair having legs with casters. The cable guide guides a cable attached to the movable member away from the casters during movement of the movable member and/or horizontal rotation of a portion of the movable member.

6 Claims, 10 Drawing Sheets

$n_1 = \alpha_1 \cdot n_0$
$n_2 = \alpha_2 \cdot n_1$
$n_3 = \alpha_3 \cdot n_2$ $n_1 = \alpha_1 \cdot n_0$
$n_2 = \alpha_2 \cdot n_1$
$n_3 = \alpha_3 \cdot n_2$

CABLE GUIDE STRUCTURE

FIELD OF THE INVENTION

This invention concerns a cable guide structure which protects cables such as telephone cords, tubes or cables (hereafter called simply "cables") when they are connected to a revolving chair with casters on its legs in such a way that they trail freely on the floor. More specifically, when electricity is supplied from the exterior to a revolving office chair with casters on its legs to provide power for a built-in health appliance such as an electric massager, shoulder heater or shiatsu device, this cable guide structure protects the power supply cable from being run over by the casters or getting wound around the legs of the chair. The scope of the invention is not limited to office chairs only; it could also be applied when a person seated in a chair is being monitored for pulse rate or other physiological data, or when a cable is providing audio or video signals to a seated person.

BACKGROUND OF THE INVENTION

An example of a revolving office chair with casters provided in the prior art is shown in FIG. 1 of U.S. Pat. No. 5,247,925 (FIG. 7 herein). This revolving chair 500 moves freely about the floor with the rotation of casters 540. Its post 520 is able to rotate 360 degrees about its center in the horizontal plane. It is customary for a person seated in such a revolving chair with casters to move about the floor while seated in the chair. At such times, if the chair has a built-in electrical appliance to which a power supply cable 550 is connected, the cable may be trapped under casters 540 (see FIG. 8) so that the casters lock up, and the cable may be damaged. Or, as is shown in FIG. 9, casters 540 may run over the cable, so that it becomes entangled among legs 530. This will limit the mobility of the chair and may cause damage to the cable.

A prior art design to alleviate these problems, which was proposed in U.S. Pat. No. 5,371,920, is shown in FIG. 10. It provides a cylindrical guard (cylindrical portion 137) around each caster (wheel assembly 119) so that the power supply cord cannot be run over. Another solution was offered in U.S. Pat. No. 4,025,099, shown in FIG. 11. A panel (flipper plate 30) is provided on the front of each caster to keep the cable away from the wheels so that it cannot be run over. Panel 30 is attached by hinge pin 31 so that it hangs down under its own weight. Its front end 33, then, is normally in contact with the floor so that it can lift up the cable.

However, the prior art designs for office chairs do not address the problem illustrated in FIG. 8, which occurs when several of the casters are locked simultaneously by being trapped in a cable lying on the floor. When one end of the cable is attached to the seat of the chair and the other is attached to a wall outlet, the cable's freedom of movement is limited. When the casters move, then, the cable can get hung up on them, which can result in the casters becoming locked. If people in an office frequently move their chairs around, this will happen again and again. When it does happen, the plug may be pulled out of the wall outlet, or the chair which is stuck may tilt on the fulcrum provided by the casters and fall over.

Or, as is shown in FIG. 9, the connection site 511 where the cable is attached to seat 510 may end up, when the seat rotates on post 520, on the side of the chair opposite socket 522 and plug 551. When this happens, the portion of electrical cord 550 which is on the floor can easily become entangled among legs 530 so that it hinders the free movement of casters 540. In the prior art solutions discussed above, then, cable connection site 511 lacks a stabilized directionality with respect toward socket 552 and plug 551; thus the danger that the cable will become entangled on casters 540 remains unaddressed.

SUMMARY OF THE INVENTION

This invention is developed in order to eliminate the problems discussed above. The object of this invention is to provide a cable guide structure which would stabilize the direction of an electrical or other cable trailing onto the floor from a revolving office chair with casters on its legs or some other revolving and movable body.

Another object of this invention is to provide a cable guide structure which would make it difficult for the cable and casters to interfere with each other regardless of the movement of the casters when the cable extends from a revolving, movable chair with a built-in electrical appliance in such a way that it can move freely on the floor.

For this purpose, the cable guide structure according to this invention has a supporting arm which holds the electrical cable virtually horizontal in the space above the legs of the chair so that it cannot be run over by the casters. This supporting arm is mounted to the post of the chair in such a way that it can revolve around the post. The arm supports the cable in the space above the legs and leads it out a given distance from the post, where it is allowed to drop from the end of the arm to the floor. This distance is somewhat beyond the radius of the rotational path of the chair legs. Thus the cable which runs out from the chair is guided along the supporting arm until it is allowed to drop to the floor a sufficient distance beyond the casters. When the chair revolves or moves, the portion of the cable which is on the floor will not be run over by the casters. In addition, this invention also provides a caster sweeper unit for each caster to sweep away the portion of the cable which is on the floor. It thus offers two separate types of cable guide structures to prevent the cable from being run over by the casters

DETAILED DESCRIPTION OF THE INVENTION

In this section we shall give a detailed explanation of several preferred embodiments of this invention, with reference to the appended drawings. Insofar as the dimensions, materials, shape, or relative positions of the constituent parts described in these embodiments are not specifically indicated, the scope of the invention is not limited to the description given, which is meant merely as an illustration.

Figure 1:
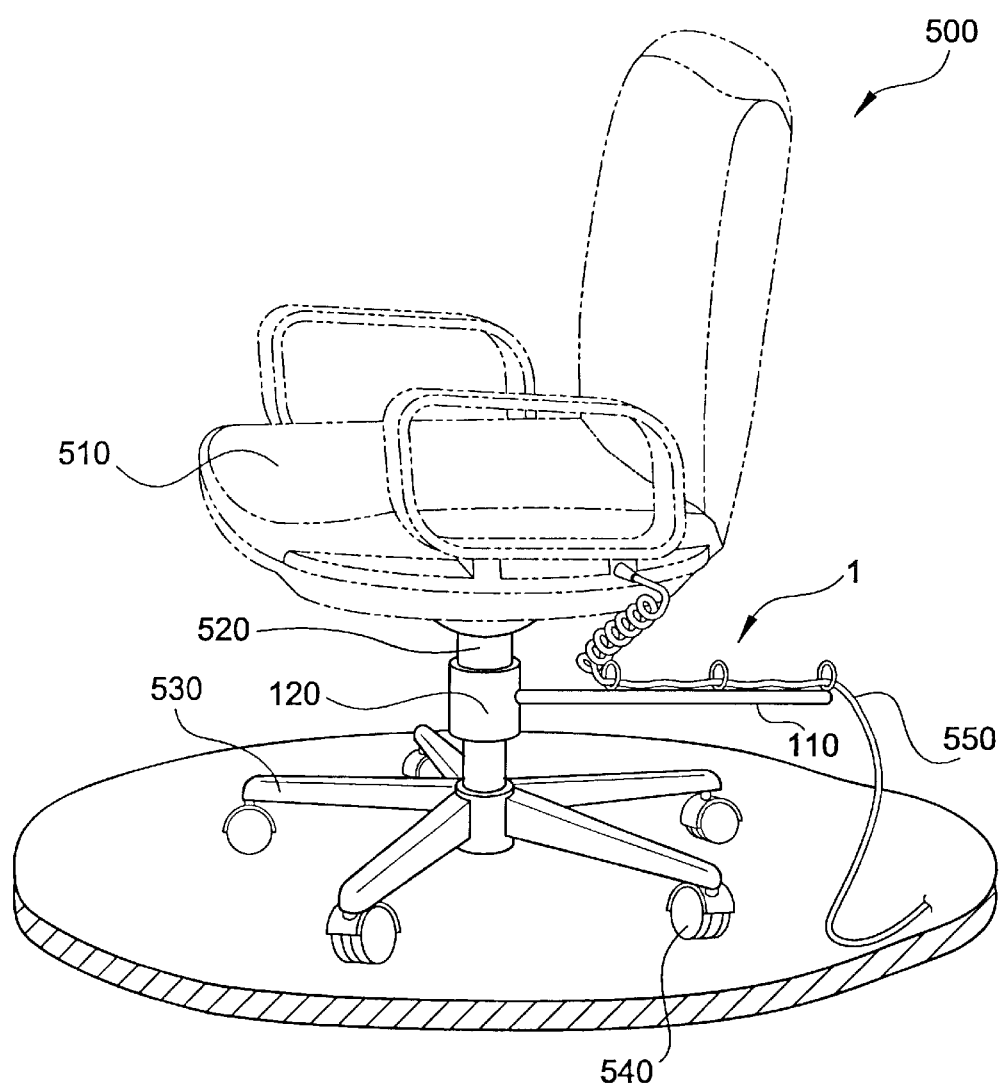
FIG. 1 illustrates a cable guide structure using a supporting arm according to the first preferred embodiment of this invention.

FIG. 1 shows a cable guide structure 1 in accordance with a first preferred embodiment of this invention. This structure includes both a supporting arm 110 and caster sweepers 200 shown in FIGS. 5A, 5B, 5C. Office chair 500, which has a built-in electrical massager, consists of seat 510, revolving post 520, which supports the seat, and legs 530. Seat 510 can revolve in the horizontal plane on post 520. Legs 530 all have casters 540 on their ends so that they can move freely about the floor.

Cable guide structure 1 supports electrical cable 550, which supplies power to the electrical massager in seat 510, in the space above the legs of the chair, and leads it from seat 510 to a location beyond the path of rotation of legs 530. In this embodiment it includes supporting arm 110 and cylindrical case 120. Supporting arm 110 extends outward virtually horizontally from cylindrical case 120. It is necessarily somewhat longer than legs 530. In other words, supporting arm 110 must be long enough so that the portion of the electrical cable which falls to the floor from the end of arm 110 cannot be run over and damaged by casters 540 when the chair moves around the floor, and long enough so that the cable does not hinder the free movement of the casters. The electrical cable 550 which originates in seat 510 is a curly cable. It is led to the site where supporting arm 110 is mounted (in the drawing, the left side of the arm 110) and supported horizontally as it is led through the space above legs 530. The supporting arm takes the cable beyond the range of the path of the legs, where it is allowed to drop to the floor.

Figure 2:
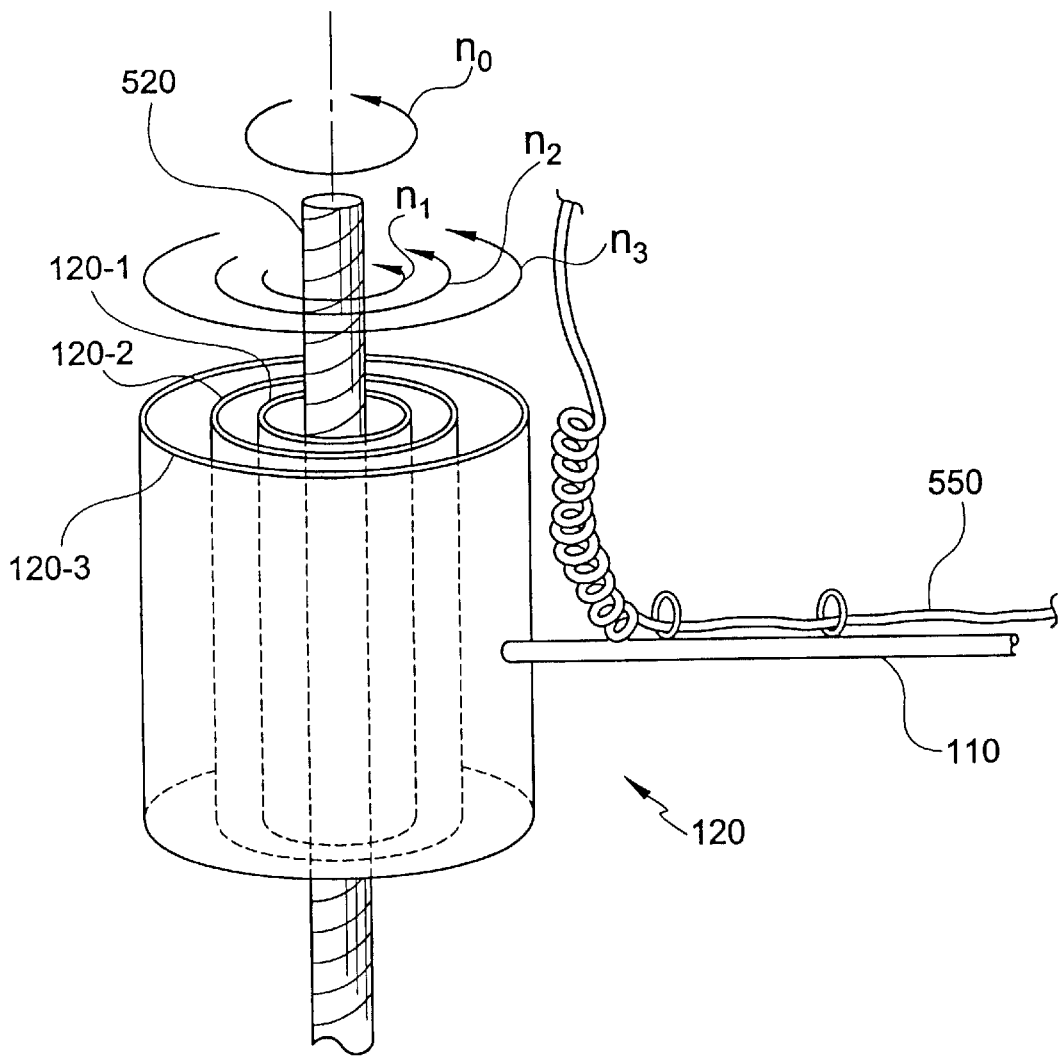
FIG. 2 illustrates a cylindrical case to fix the supporting arm.

As can be seen in FIG. 2, cylindrical case 120 consists of discrete cases 120-1, 120-2 and 120-3. These three cases surround and are concentric with rotary post 520. Each of the three cases can rotate freely around the post and has a specific coefficient of friction with respect to the other cases. Post 520 and the closest case, case 120-1, rotate freely with respect to each other at friction coefficient $\alpha_1$. Case 120-1 rotates freely with the next case, 120-2, at friction coefficient $\alpha_2$. Case 120-2 and the furthest case, 120-3, rotate freely with each other at friction coefficient $\alpha_3$. Thus the rotation moment $n_1$ of case 120-1, the closest one to post 520, can be determined with respect to the rotation moment $n_0$ of the post by the following.

$$n_1 = \alpha_1 \times n_0$$

Similarly, the rotation moment of cases 120-1 and 120-2 and that of 120-2 and 120-3 can be obtained by the following.

$$n_2 = \alpha_2 \times n_2$$

$$n_3 = \alpha_3 \times n_2$$

Thus the friction coefficient of the furthest case, 120-3, with respect to the rotation moment $n_0$ of post 520, is obtained by cumulating the three friction coefficients $\alpha_1$, $\alpha_2$ and $\alpha_3$; so case 120-3 will barely rotate with post 520. In other words, when seat 510, which is attached to post 520, rotates, supporting arm 110, which is attached to case 120-3, will barely rotate. The electrical cable 550 which is guided by the supporting arm will thus continue to lie in the same direction.

By providing a number of discrete cases, 120-1, 120-2, 120-3 we create a situation in which the coefficient of friction between each two cases is raised to a power of the coefficient of the previous two cases. Thus supporting arm 110, which is attached horizontally to the furthest case, 120-3, will be independent of the rotation of post 520, which can then rotate smoothly. The number of discrete cases needed is determined by the cumulative coefficient of friction necessary to insure that the furthest case, 120-3, will not be affected by the rotation of post 520 and legs 530.

In the description given, the discrete cases are placed quite close to each other to achieve the appropriate coefficients of friction; however, the invention is not limited to this example only. Rod bearings, for example, could also be used between the cases.

With this configuration, supporting arm 110 rotates freely about post 520. When post 520 rotates, then, electrical cable 550, which hangs down at the end of supporting arm 110, will normally continue to lie on the floor in the direction collinear with arm 110. The cable, that is, will not be pulled when seat 510 rotates. Supporting arm 110 is an appropriate height off the floor, and extends far enough from post 520, so that electrical cable 550 will not fall to the floor between two legs 530. In other words, the supporting arm holds electrical cable 550 in the space above legs 530 so that when the cable does go down to the floor it cannot get tangled up in casters 540. Supporting arm 110 can be flexible so that when it is not being used it can be retracted and stored below the upper portion of the chair.

Figure 3:
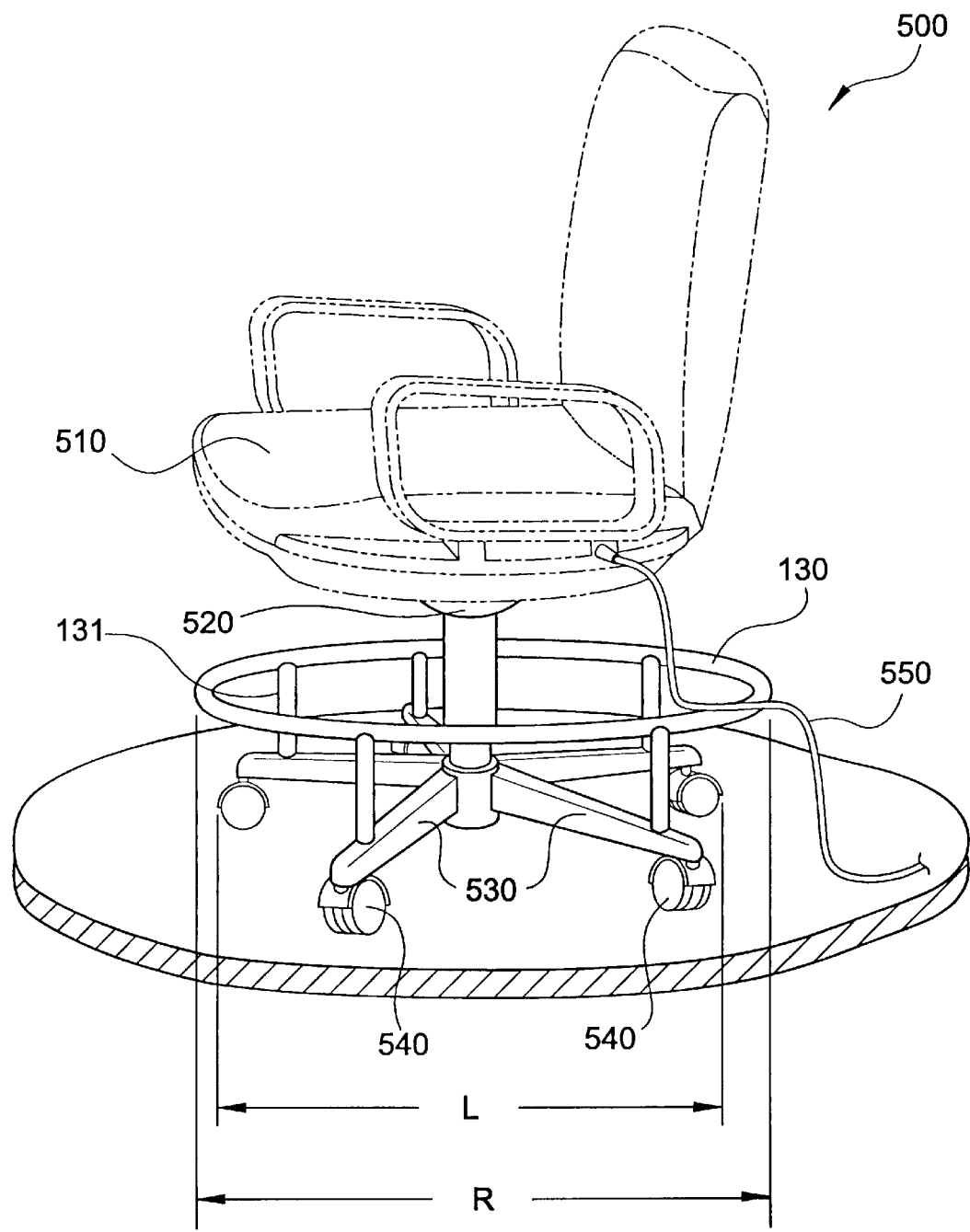
FIG. 3 illustrates a cable guide structure using a supporting ring according to the second preferred embodiment of this invention.

FIG. 3 shows a second preferred embodiment. In place of the supporting arm 110 in the first embodiment, this embodiment has a supporting ring 130. Ring 130 is fastened horizontally to the post in the space above legs 530 by means of mounting hardware 131. The upper surface 132 of ring 130 is fashioned of a smooth material and shaped smoothly so that the electrical cable 550 which comes out of seat 510 will move along this smooth surface when seat 510 rotates. The diameter R of ring 130 is greater than the diameter L of the floor area defined by legs 530. As a result, when electrical cable 550 falls to the floor from the edge of ring 130, it is further from the post than are the casters 540 on the ends of legs 530. The portion of cable 550 which is on the floor cannot interfere with casters 540, and consequently casters 540 cannot run over the portion of the cable on the floor. The chair illustrated in the FIG. 3 embodiment may also employ caster sweepers 200 shown in FIGS. 5(A), 5(B) and 5(C).

Figure 4:
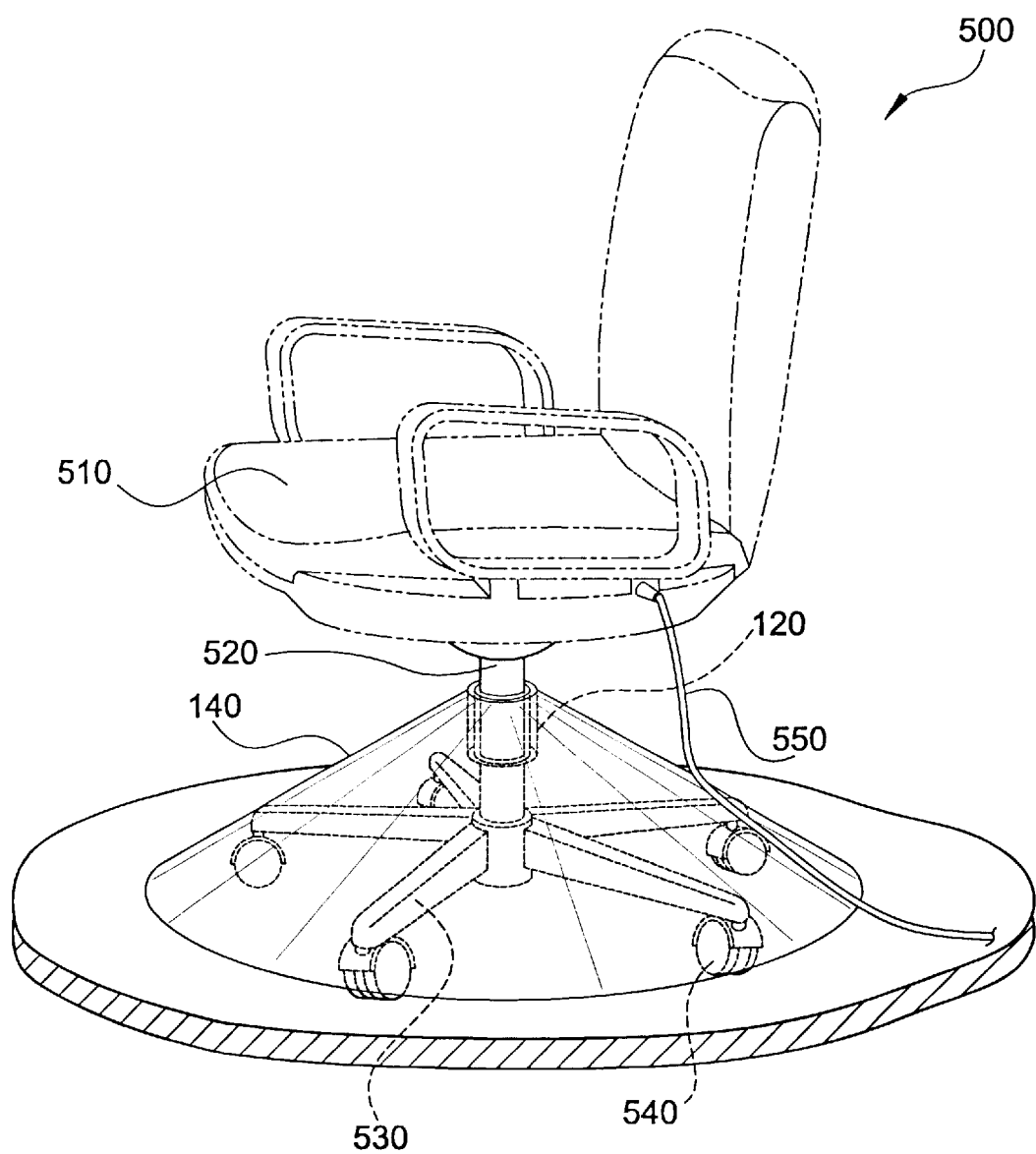
FIG. 4 illustrates a cable guide structure using a conical supporting skirt according to the third preferred embodiment of this invention.

FIG. 4 shows the third preferred embodiment of the invention. Here rotary post 520 and all of casters 540 are covered by skirt 140. Just as in the first embodiment, skirt 140 is mounted to post 520 through a number of cylindrical cases 120 in such a way that it is free to rotate. The lower edge of skirt 140 almost meets the floor, and it covers the tops of casters 540 and their entire surfaces in such a way that it keeps the portion of cable lying on the floor away from the casters. The skirt could be made of a conical plastic cover or fashioned from a metal plate.

Because skirt 140 is conical in shape, when the electrical cable 550 which comes out of seat 510 falls by its own weight onto the upper portion of the skirt, it will run along the surface of the cone down to the floor. Since the bottom of the skirt almost touches the floor, the portion of the cable lying on the floor will be pushed away from the chair by the skirt even when the entire chair moves across the floor. This effectively prevents the cable from being run over by casters 540.

And because skirt 140 encloses the space above legs 530, it prevents cable 550 from falling to the floor between two adjacent legs 530 and getting run over by casters 540.

Figure 5A:
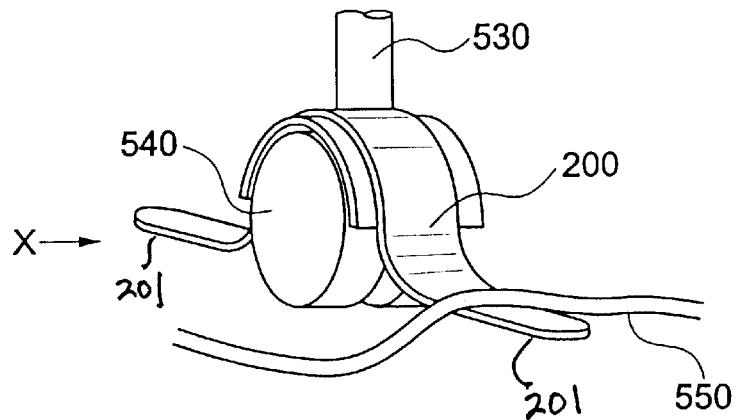
FIGS. 5A, 5B, and 5C illustrate a cable guide structure using a caster sweeper according to the fourth preferred embodiment of this invention.
Figure 5B:
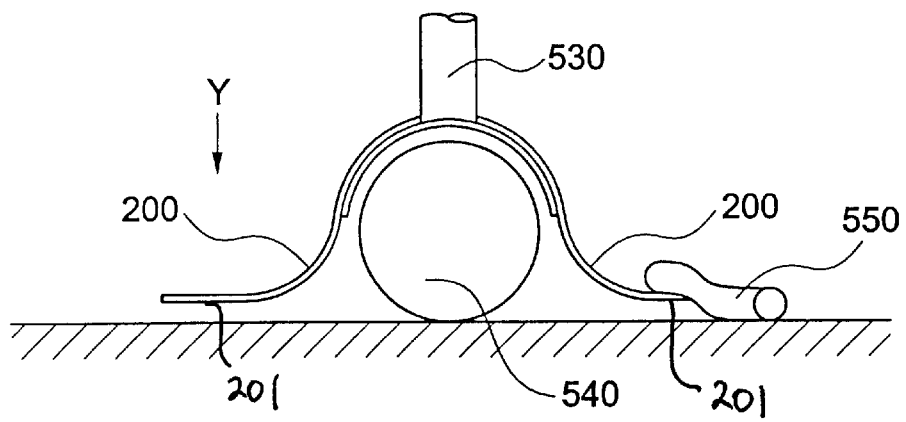
Figure 5C:
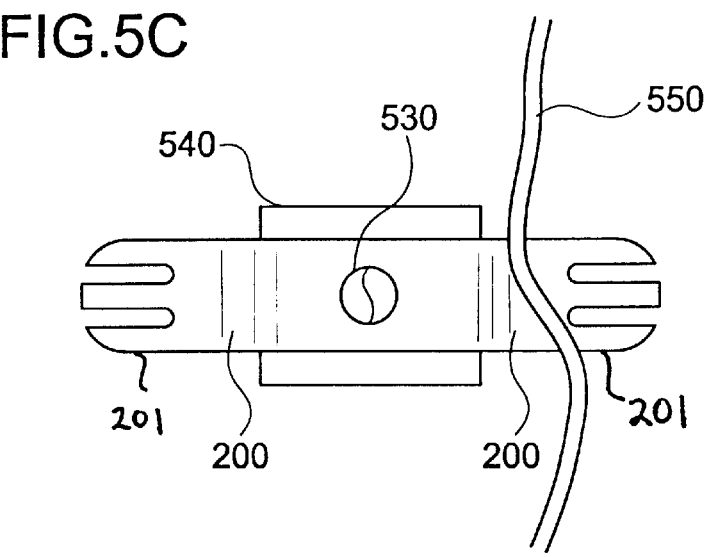

FIGS. 5(A), (B) and (C) show the configuration of a caster sweeper 200, in a fourth preferred embodiment of the invention which can be used on the casters of a chair having the cable guide structure of FIGS. 1, 3 or even FIG. 4, depending on how close skirt 140 comes to the floor. The caster sweeper 200 can also be used with the casters of a chair which does not have cable guide structure. Caster sweepers 200 are devices to lift up the portion of the cable which is on the floor. As can be seen in FIG. 5(A), the caster sweeper has a tongue-shaped front portion 201 which covers the front surface of caster 540. As can be seen in FIG. 5(B), caster sweepers are mounted on both the front and rear of each caster 540, which is fixed to the bottom of a leg 530. Front portions 201 extend almost to the floor and are bent in such a way as to scoop up the portion of cable on the floor so that it remains parallel to the floor. Front portions 201 should be fashioned from a flexible substance such as plastic so that even when casters 540 are partially sunk into a soft carpet on the floor, portions 201 can come in close contact with the top of the carpet. They might also be molded as a single piece with caster covers 541. As can be seen in FIG. 5(C), front portions 201 may be fork-shaped.

Figure 6:
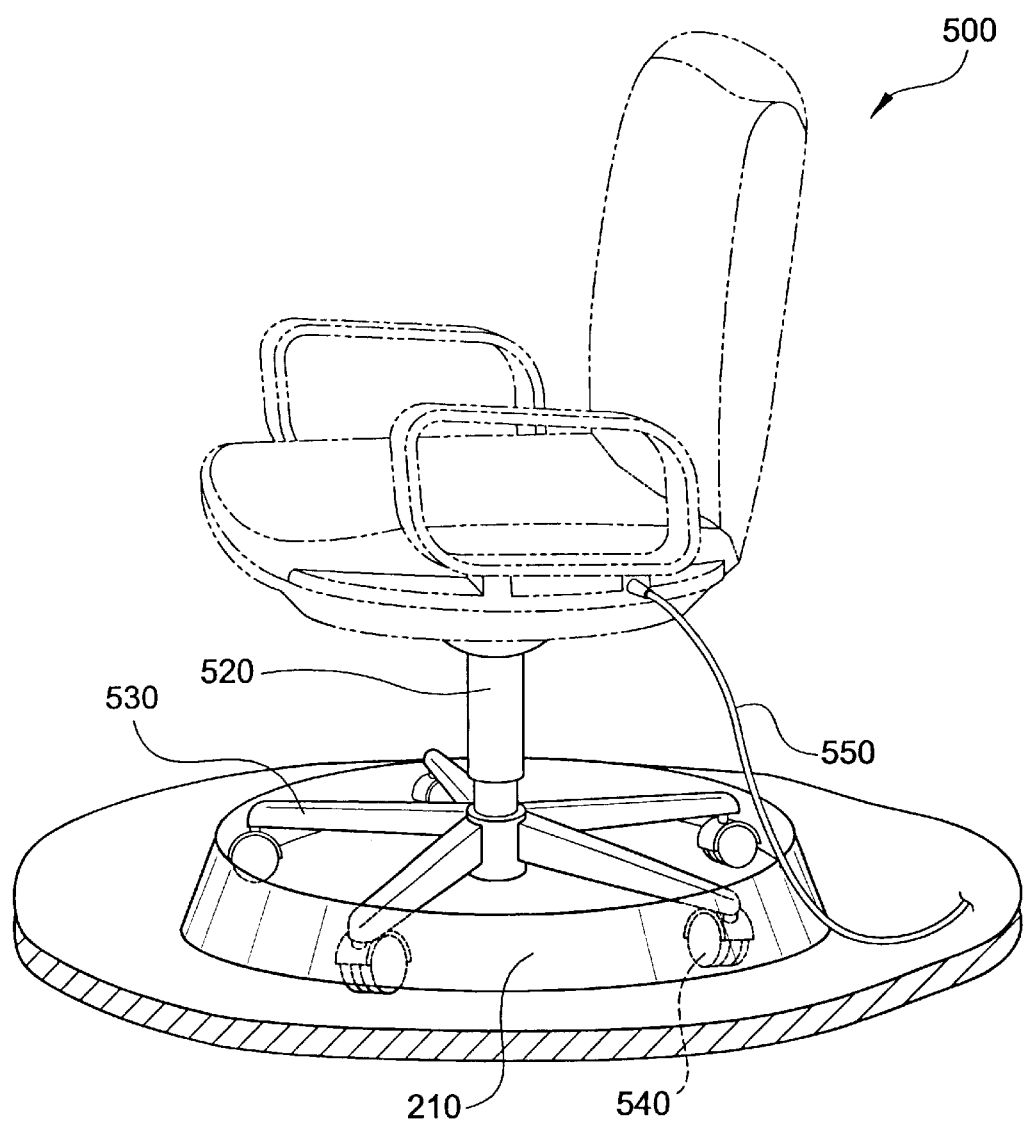
FIG. 6 illustrates a cable guide structure using a caster belt according to the fifth preferred embodiment of this invention.
Figure 7:
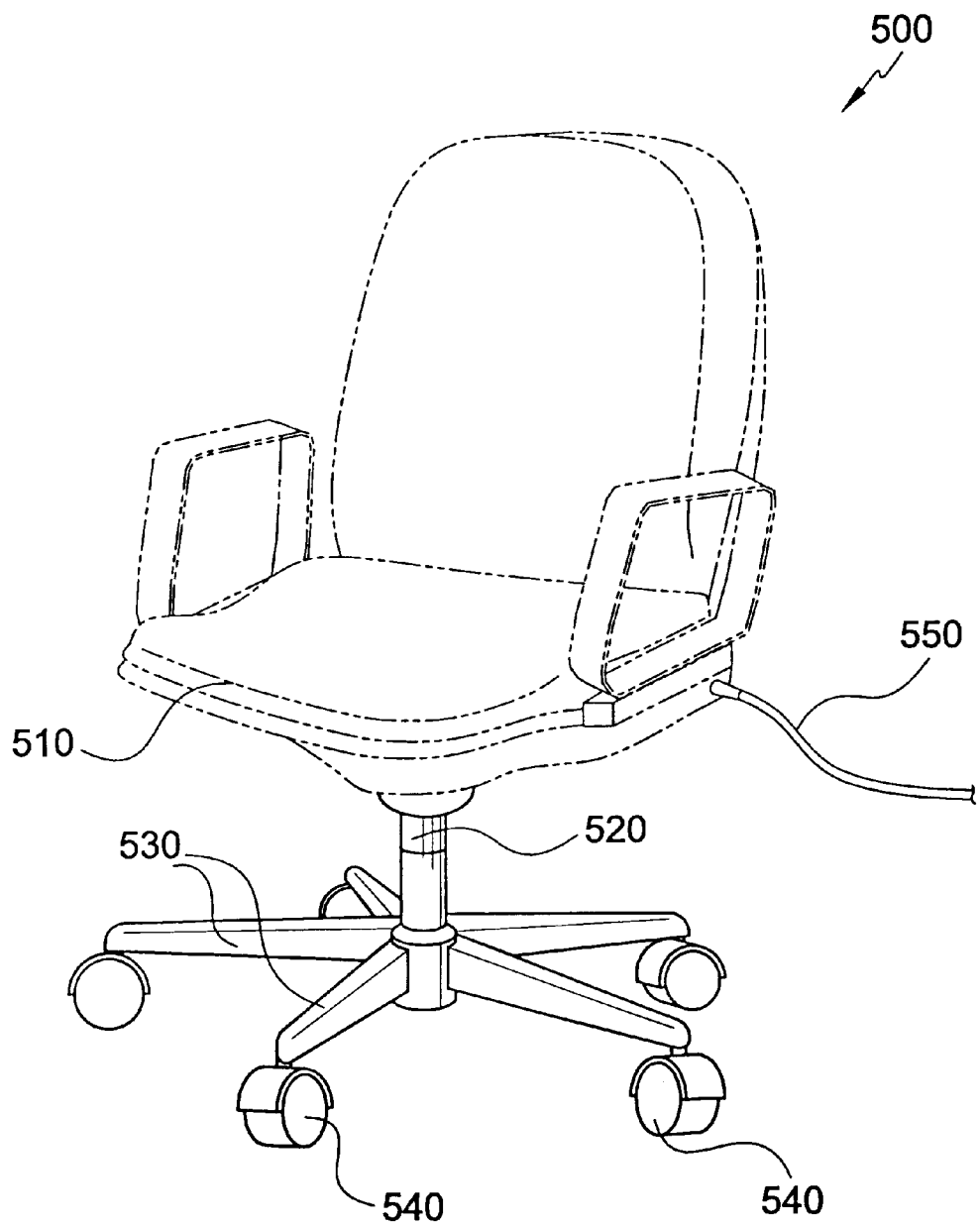
FIG. 7 illustrates an office chair provided with a power cable according to a prior art.
Figure 8:
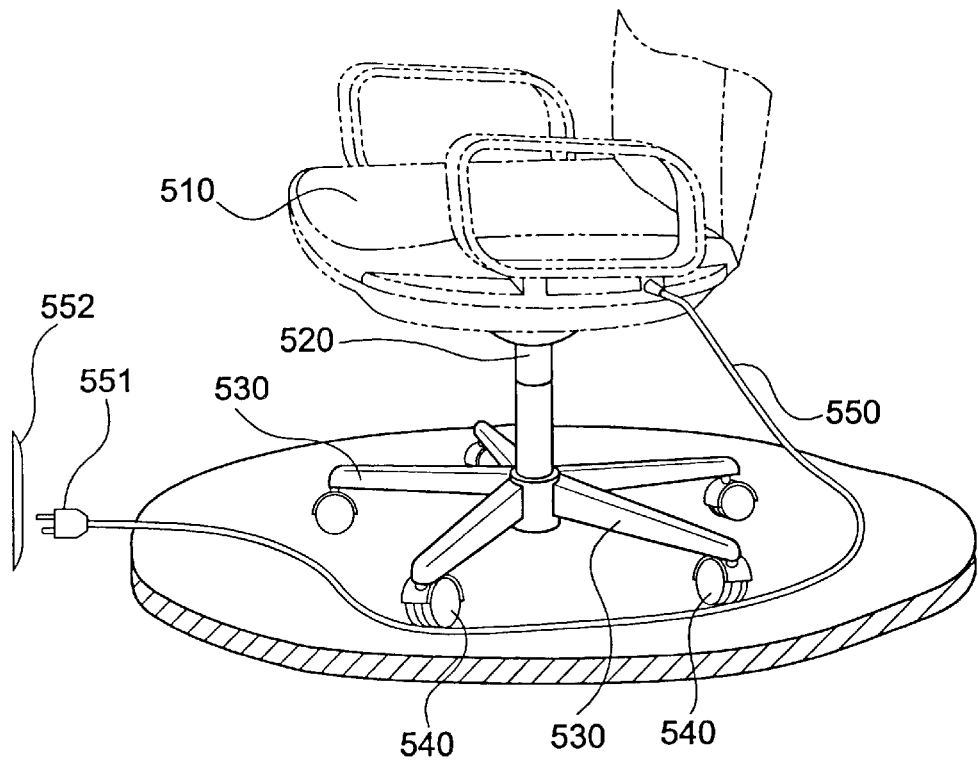
FIG. 8 illustrates a disadvantage of an office chair with a power cable according to a prior art.
Figure 9:
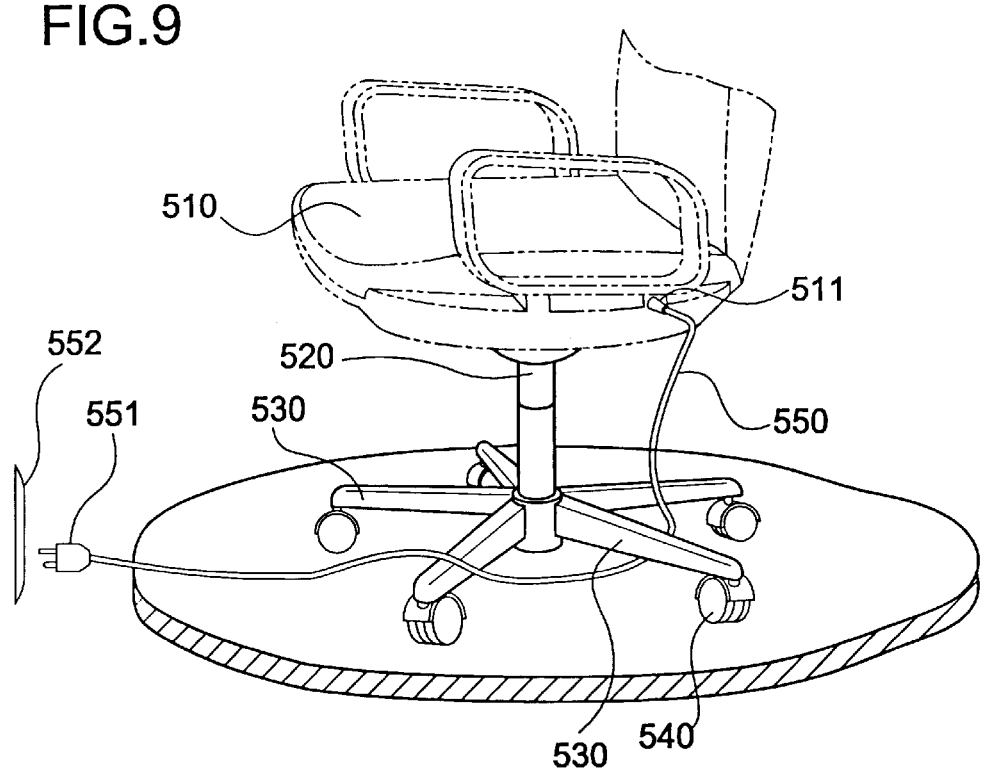
FIG. 9 illustrates another disadvantage of an office chair with a power cable according to a prior art.
Figure 10:
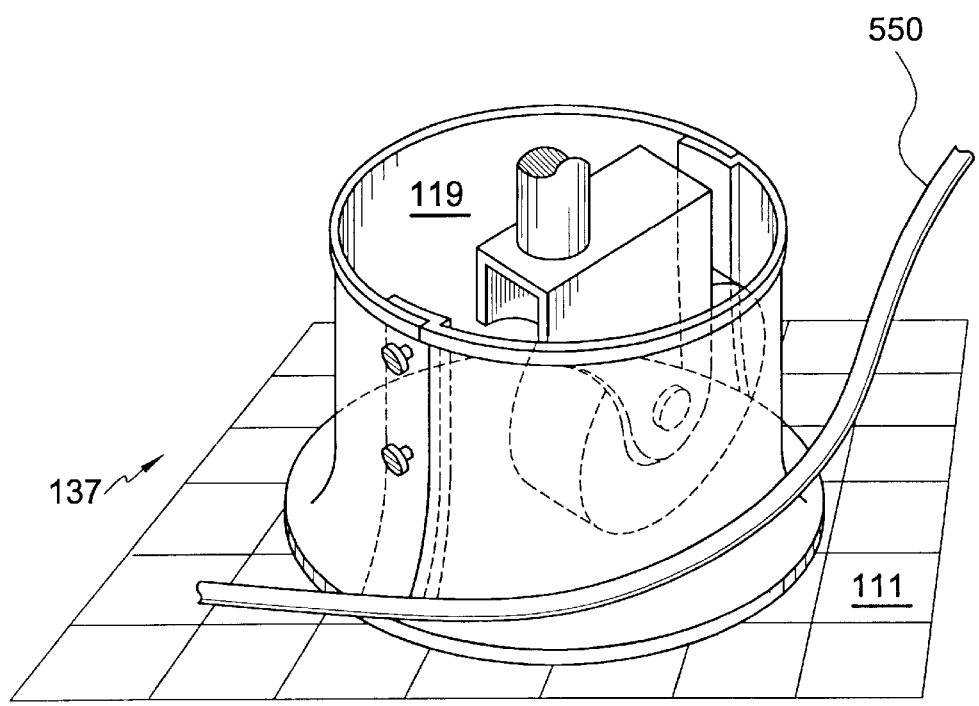
FIG. 10 illustrates another prior art structure.
Figure 11:
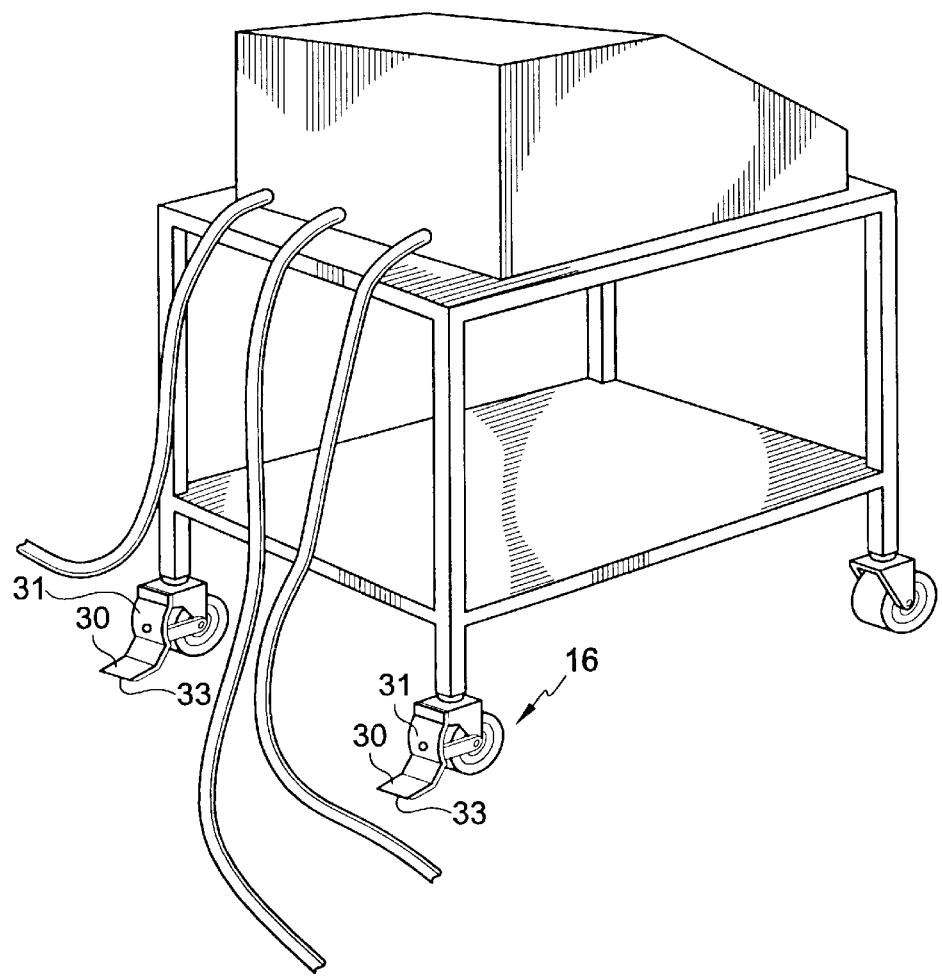
FIG. 11 illustrates another prior art structure.

FIG. 6 shows the fifth preferred embodiment of this invention. In place of the caster sweepers of the third embodiment, this embodiment has caster belt 210. Instead of discrete pairs of caster sweepers 200 attached to individual casters 540 as in the third embodiment, caster belt 210 is a single piece which covers all the casters 540 which are attached to the bottoms of the legs. It pushes away any cable lying on the floor so that it will not be run over by casters 540. The top of caster belt 210 is fastened to legs 530. The bottom of the belt should be fashioned from a flexible substance such as plastic so that even when casters 540 are partially sunk into a soft carpet on the floor, the belt can come in close contact with the top of the carpet.

This invention features a cable guide structure with a simple configuration which guides an electrical cord or other cable beyond the reach of the legs of an office chair. The cord cannot interfere with the rotation of the casters, so the chair can move smoothly around the floor. If a supporting arm is used which is mounted to a cylindrical case revolving independently of the post of the chair, the electrical cord will ordinarily remain in the same orientation and will not become wound around the post.

The supporting arm 110, supporting ring 130 and skirt 120 according to this invention can all be made cheaply from plastic. They are simple to mount and can be attached easily to any office chair.

Attaching caster sweepers 200 in front of the casters or installing a caster belt 210 will insure that any cable which happens to get close to a caster will be pushed away and will enable the office chair to be moved smoothly at all times.

Although the invention has been described above in connection with exemplary embodiments, it is apparent that many modifications can be made without departing from the spirit or scope of the invention. Accordingly, the invention is not to be considered as limited by the foregoing description, but is only limited by the scope of the appended claims.

What is claimed is:

1. A cable guide structure for a movable body which has legs, casters attached to said legs, and a horizontally rotatable portion supported on said legs through a post, said guide structure comprising:

a cable guide member for guiding a cable attached to said movable body in a manner which prevents said cable from interfering with said casters upon movement of said movable body or rotation of said horizontally rotatable portion;

a cylindrical case which can rotate freely around said post but independently of the rotation of the post; and wherein said cable guide member comprises a supporting arm which is fixed to said cylindrical case and extends horizontally from said case to support said cable as it runs through a space over said legs.

2. A cable guide structure for a movable body which has legs, casters attached to said legs, and a horizontally rotatable portion supported on said legs through a post, said guide structure comprising:

a cable guide member for guiding a cable attached to said movable body in a manner which prevents said cable from interfering with said casters upon movement of said movable body or rotation of said horizontally rotatable portion;

a cylindrical case which can rotate freely around said post but independently of the rotation of the post;

wherein said cable guide member comprises a supporting arm which is fixed to said cylindrical case and extends horizontally from said case to support said cable as it runs through a space over said legs, wherein said supporting arm rotates freely around said post, and its rotation is independent of the rotation of the post.

3. A cable guide structure for a movable body which has legs, casters attached to said legs, and a horizontally rotatable portion supported on said legs through a post, said guide structure comprising:

a cable guide member for guiding a cable attached to said movable body in a manner which prevents said cable from interfering with said casters upon movement of said movable body or rotation of said horizontally rotatable portion;

a cylindrical case which can rotate freely around said post but independently of the rotation of the post;

wherein said cable guide member comprises a supporting arm which is fixed to said cylindrical case and extends horizontally from said case to support said cable as it runs through a space over said legs, wherein said supporting arm rotates freely around said post, and its rotation is independent of the rotation of the post; and wherein said cylindrical case comprises a plurality of concentric cases which can rotate with respect to each other, said supporting arm being fixed to said concentric case farthest from said post, and said supporting arm rotates freely and independently from the rotation of said post.

4. A cable guide structure for a movable body which has legs, casters attached to said legs, and a horizontally rotatable portion supported on said legs through a post, said guide structure comprising:

a cable guide member for guiding a cable attached to said movable body in a manner which prevents said cable from interfering with said casters upon movement of said movable body or rotation of said horizontally rotatable portion;

a cylindrical case which can rotate freely around said post but independently of the rotation of the post; and wherein said cable guide member is fixed to said cylindrical case and extends from said case to support said cable as it runs through a space over said legs.

5. A cable guide structure for a movable body which has legs, casters attached to said legs, and a horizontally rotatable portion supported on said legs through a post, said guide structure comprising:

a cable guide member for guiding a cable attached to said movable body in a manner which prevents said cable from interfering with said casters upon movement of said movable body or rotation of said horizontally rotatable portion;

a cylindrical case which can rotate freely around said post but independently of the rotation of the post;

wherein said cable guide member is fixed to said cylindrical case and extends from said case to support said cable as it runs through a space over said legs wherein said cable guide member rotates freely around said post, and its rotation is independent of the rotation of the post.

6. A cable guide structure for a movable body which has legs, casters attached to said legs, and a horizontally rotatable portion supported on said legs through a post, said guide structure comprising:

a cable guide member for guiding a cable attached to said movable body in a manner which prevents said cable from interfering with said casters upon movement of said movable body or rotation of said horizontally rotatable portion;

a cylindrical case which can rotate freely around said post but independently of the rotation of the post;

wherein said cable guide member is fixed to said cylindrical case and extends from said case to support said cable as it runs through a space over said legs, wherein said cable guide member rotates freely around said post, and its rotation is independent of the rotation of the post; and wherein said cylindrical case comprises a plurality of concentric cases which can rotate with respect to each other, said cable guide member being fixed to one of said concentric cases which is farthest from said post, and said cable guide member rotates freely and independently from the rotation of said post.

* * * * *